Figure 1:
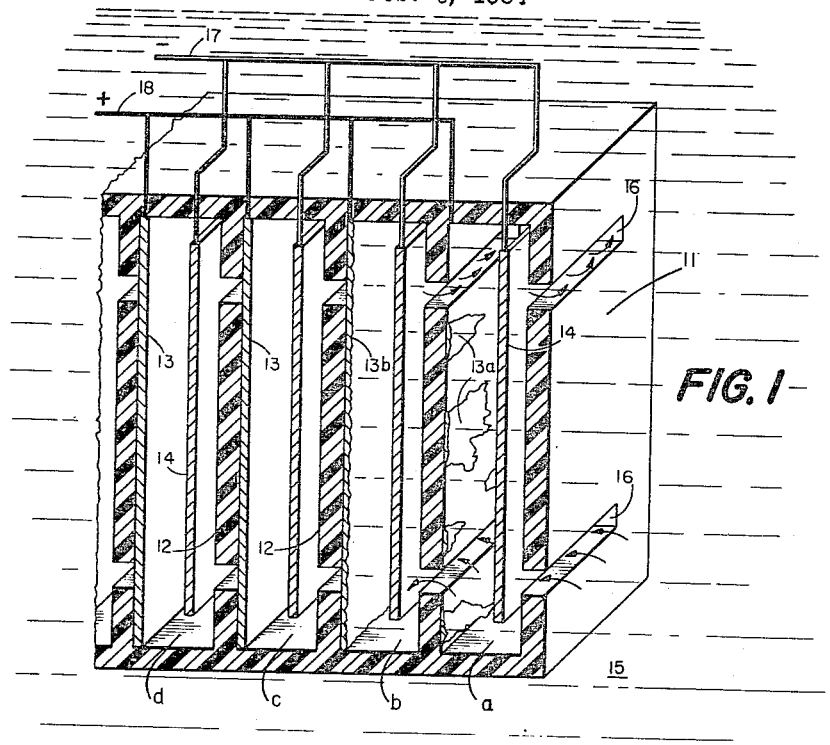

May 23, 1967      B. J. WILSON      3,321,335

SEA WATER BATTERY

Filed Feb. 5, 1964

INVENTOR
BURTON J. WILSON
BY George J. Crasanakis AGENT
Richard C. Reel ATTORNEY

United States Patent Office 3,321,335
Patented May 23, 1967

3,321,335
SEA WATER BATTERY
Burton James Wilson, Bethesda, Md., assignor to the United States of America as represented by the Secretary of the Navy
Filed Feb. 5, 1964, Ser. No. 342,834
3 Claims. (Cl. 136—100)

The invention described herein may be manufactured and used by or for the Government of the United States of America for governmental purposes without the payment of any royalties thereon or therefor.

This invention relates to a magnesium sea water battery and more particularly to a novel sea water battery in which a plurality of battery sections are activated in sequence during the period of operation.

Magnesium batteries which have been designed for use in sea water experience considerable difficulty to remain in operation for a reasonable length of time and to utilize efficiently the stored energy in an external electrical circuit. An inherent shortcoming of any battery or other electrical device which is exposed to sea water lies in the fouling action of the sea; calcareous and carbonaceous deposits along with microscopic sea life, particulate matter, silt and drifting debris being ever present to contaminate submerged objects. The corrosive nature of salt water on metals and the increased metal loss drastically reduce the operable life of metallic electrodes.

In previous batteries that have been tetsed for sea operation, the entire electrode system was exposed to the action of sea water electrolyte. This arrangement was disadvantageous because the fouling action of the sea gradually lowered the battery voltage and electrical output of the battery, resulting in inactivation of the external electrical circuit.

The present invention provides for a novel sea water battery which is capable of continuous operation for a relatively longer period without loss of potential or reduction in electrical power. The present battery employs a structure which is capable of coping with the fouling action of the sea and provides a constant energy output for any predetermined period of operation based on the requirements of remotely operated devices such as signal buoys, underwater detection systems and the like. The novel battery in accordance with the invention is utilized in a manner which defers electrochemical action to a substantial portion of the electrode system until it has been placed in operation. The electrode metals are thus preserved from corrosion and contamination until the stored energy therein is to be utilized. Once the battery action has begun, the electrochemical action is maintained by sequentially activating additional electrodes to the action of sea water electrolyte.

It is an object of the present invention to provide a novel sea water battery which can operate more efficiently than prior art batteries of this type.

Another object of the invention is to provide a battery that can furnish a relatively constant low voltage energy for an extended period.

A further object of the invention is to provide a sea water battery wherein reserve energy is preserved in oceanic or sea environment and automatically activated and utilized in predetermined time intervals.

These and further objects and advantages will become more evident from the following detailed description and accompanying illustrations of preferred embodiments of the invention.

Figure 2:
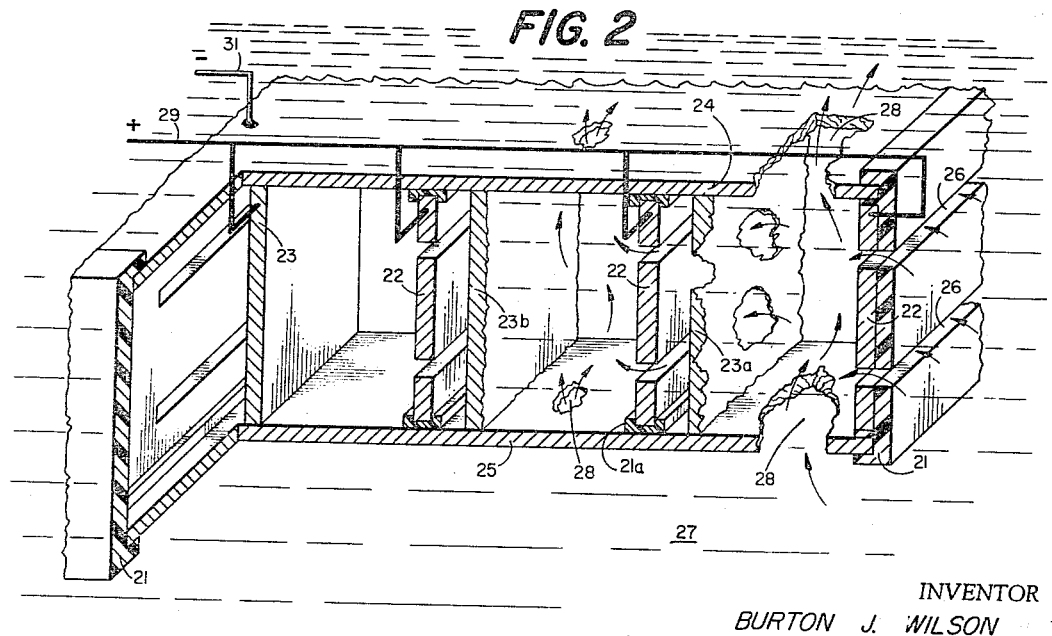

In the drawings:

FIG. 1 is a cross-sectional view, broken off at one end, of a sea water battery in accordance with the present invention, and FIG. 2 is a cross-sectional view in part showing another embodiment of the present battery.

According to the invention a battery is divided into a plurality of sections or compartments, each section containing electrodes formed of opposite sheets of different metals spaced apart from each other. The anode sheets which are formed of comsumable metal form watertight closures between adjacent battery sections. The battery is placed in operation by flooding the first section with sea water electrolyte. As the anode metal is consumed by anodic action during electrical output, the metal closure will wear through, allowing sea water to flood the adjacent section. The electrical burden is taken up by each battery section in sequence. This activation process continues serially, until all sections have been sequentially activated. The inactivation of depleted sections leaves all the remaining sections unaffected.

The sea water battery illustrated in FIG. 1 comprises an insulating casing 11 divided internally into a plurality of battery compartments $a$, $b$, $c$ and $d$ by means of insulating partitions 12. Each of said partitions and the casing wall at the end compartment $a$ are provided with one or more openings, shown in the drawing as rectangular slots 16. The partitions may be formed of a polyester, phenolic or other suitable insulating material. Anode sheets 13 are formed of magnesium or high magnesium alloys. The anode sheets are positioned against the insulating partitions 12 and attached thereto to form a water-tight closure. The inert cathodes 14 are formed of steel sheets, surface-plated with nickel, palladium or other suitable plating metal. The electrodes in each compartment are sufficiently massive to provide the necessary energy output from each individual compartment. The battery is maintained indefinitely in the dry, inert condition until it is ready for use.

Activation of the battery is achieved by introducing salt water electrolyte 15 into the initial or end compartment $a$ through casing slots 16. More particularly, the battery is activated by immersing it in sea water, the end compartment $a$ becomes flooded with sea water and electrical power is made available through the external terminals. The cathode sheets are connected together to external terminals 17; the magnesium sheets are connetcted together to terminal 18. Following activation of compartment $a$ electrical output is initiated and maintained for the entire life of the battery. As the magnesium electrode is being consumed, the metal will wear thin and become ruptured, the sea water flooding the neighboring compartment $b$. The anode 13$b$ now furnishes the electrical energy as the available energy from section $a$ diminishes. The other sections $c$ and $d$ will be activated in a similar manner. The wear out of the anode 13$a$, as shown in the drawing, will inactivate section $a$, but the battery action will be sustained by each succeeding battery section. The battery experiences no interference or reduction of energy from any of the depleted sections. The small arrows as shown in FIG. 1 represent water flow or circulation resulting from the reaction of the battery after the battery has been activated by emersion into sea water and after water has entered the first section through slots 16.

In accordance with the modification illustrated in FIG. 2, the battery structure provides essentially a series of parallel metal electrodes. Casing 21 contains a plurality of cathode sheets 22 and anode sheets 23, as in the previous embodiment, but the casing in the present embodiment is subdivided into sections by the magnesium anodes. The casing includes thin metallic walls of high purity magnesium for top closure 24 and bottom closure 25. The anodes are sealed to the metallic walls and form a single electrical conductor therewith. Insulating supports 21$a$ provide electrical insulation and rigid support for the cathodes. The end surface of the casing in the end section and each of the cathode sheets has openings 26 therein for the passage of sea water electrolyte 27. The battery is activated by flooding the end compartment and obtaining the stored energy in the manner described for the previous embodiment. The consumption of the magnesium sheet 23a allows sea water to pass into and activate the adjacent section wherein sheet 23b provides further energy release. In the present embodiment, activation of each cell also induces rapid anodic action in the high purity magnesium plates 24 and 25 causing them to be consumed rapidly and form external openings 28. Openings or vents in the top and bottom plates causes a rapid sweep of fresh electrolyte to enter into the section thus providing free passage of electrolyte. It may be noted that any deposition or fouling in the activated section along with hydrogen gas accumulation as a result of battery action can be vented and readily displaced by the increased amount of electrolyte sweeping through the battery section.

In the event of a short circuit failure (caused by broken pieces of magnesium), concentrated electrochemical activity at the immediate site of the short will eventually wear away the contacting piece and restore the current to its normal level.

The high purity magnesium plates are substantially resistant to the sea water but are reactive to electrochemical action. Thus relatively thin magnesium plates are consumed more rapidly than the more massive electrode sheets. The usual commercial grade magnesium is generally satisfactory for anode material. The high purity magnesium refers to a metal in which the iron content does not exceed about 0.002 percent and the nickel present therein is not more than 0.001 percent by weight. The magnesium sheets may have a thickness up to ¼ of an inch.

A significant feature of the instant invention is that the anode sheets may be of such a thickness which will become depleted in a given time interval. Thus, the various sections may contain anode sheets with varying thicknesses to extend or decrease the operable time of each succeeding section. In any event the operable time of each section should have a lifetime somewhat less than the time wherein fouling action of the sea water would interfere with the battery action.

While the invention is described in connection with a specific electrochemical structure it is obvious to those skilled in the art that other arrangements may be used for the purposes of the present invention without departing from the spirit and scope of the invention as set forth in the appended claims.

What is claimed is:
1. A sea water battery comprising:
 a substantially enclosed casing of insulating material,
 a plurality of insulating partitions dividing said casing internally into individual sections,
 openings in each of said partitions,
 openings communicating one of said sections in the interior of said casing with the exterior thereof for passage of electrolyte therethrough,
 an electrode of magnesium sheet and an electrode of nickel-coated steel in each section of said casing,
 each of said magnesium sheets abutting its respective insulating partition sealing the respective openings in each of said partitions, and
 electrical leads connecting said electrode of magnesium and said electrode of steel to external battery terminals.
2. A sea water battery as claimed in claim 1, wherein:
 each of said partitions has two openings therein.
3. A sea water battery as claimed in claim 2, wherein:
 said openings are located in the end wall of said casing.

References Cited by the Examiner
UNITED STATES PATENTS 3,036,141  5/1962  Goldenberg et al.
3,177,099  4/1965  Kirk et al.

WINSTON A. DOUGLAS, *Primary Examiner.*

V. OHLENDORF, A. SKAPARS, *Assistant Examiners.*